United States Patent [19]

Roehrs et al.

[11] Patent Number: 5,287,549
[45] Date of Patent: * Feb. 15, 1994

[54] COMMUICATION DEVICE AND METHOD USING TRANSCEIVER SQUELCH CONTROL

[76] Inventors: Michael R. Roehrs, 20331 Bluffside, #115, Huntington Beach, Calif. 92646; Robert E. Gorney, 5710 Felspar, Riverside, Calif. 92509

[*] Notice: The portion of the term of this patent subsequent to Oct. 15, 2008 has been disclaimed.

[21] Appl. No.: 776,618

[22] Filed: Oct. 15, 1991

Related U.S. Application Data

[63] Continuation of Ser. No. 386,023, Jul. 26, 1989, Pat. No. 5,058,205, which is a continuation-in-part of Ser. No. 152,769, Feb. 5, 1988, abandoned.

[51] Int. Cl.$^5$ ............................................. H04B 1/10
[52] U.S. Cl. ................................. 455/35.1; 455/218; 340/825.07
[58] Field of Search .................. 455/35, 212, 218, 186, 455/202, 203, , 35.1, 186.1, 186.2, 221, 34.1, 34.2; 370/24, 32, 31; 340/825.07

[56] References Cited

U.S. PATENT DOCUMENTS

| | | | |
|---|---|---|---|
| 3,733,554 | 5/1973 | Wycoff et al. | 325/478 |
| 3,739,278 | 6/1973 | Gautney et al. | 325/64 |
| 4,010,461 | 3/1977 | Stodolski | 340/311 |
| 4,153,878 | 5/1979 | Osborn | 325/370 |
| 4,385,398 | 5/1983 | Wycoff et al. | 455/36 |
| 4,414,689 | 11/1983 | Enderson | 455/221 |
| 4,430,755 | 2/1984 | Nadir et al. | 455/35 |
| 4,434,504 | 2/1984 | Fredrickson | 455/32 |
| 4,479,250 | 10/1984 | Flood | 455/213 |
| 4,484,355 | 11/1984 | Henke et al. | 455/76 |
| 4,517,561 | 5/1985 | Burke et al. | 340/825.07 |
| 4,546,467 | 10/1985 | Yamamoto | 370/13 |
| 4,625,331 | 11/1986 | Richardson et al. | 455/25 |
| 4,627,102 | 12/1986 | Nott | 455/221 |
| 4,646,358 | 2/1987 | Shanley | 455/35 |
| 4,783,845 | 11/1988 | McChesney et al. | 455/35 |
| 4,947,454 | 8/1990 | Garner | 455/34 |
| 5,058,205 | 10/1991 | Roers et al. | 455/35 |
| 5,073,972 | 12/1991 | Tendler et al. | 455/35 |

*Primary Examiner*—Reinhard J. Eisenzopf
*Assistant Examiner*—Edward Urban

[57] ABSTRACT

An audio squelch control for transceiver stations in which all transceivers are initially in a Call mode with the squelch control turned on. While in the Call mode, the squelch control is turned off, enabling the speaker, by receiving the station's coded address, plus a flag bit that is set, from a transmitting station. In addition to having the squelch circuit turned off, the receiving station is changed from the Call mode to an Auto mode. When in the Auto mode, the squelch control is turned off by receiving the station's coded address with the flag bit turned off. The squelch control of a station in one mode does not respond to a station in the opposite mode even if it receives its own coded address.

17 Claims, 5 Drawing Sheets

IF A RETURN ACKNOWLEDGEMENT IS Rx DURING THE 10 SFC LOOP, IT WILL GO TO THE AUTO MODE.

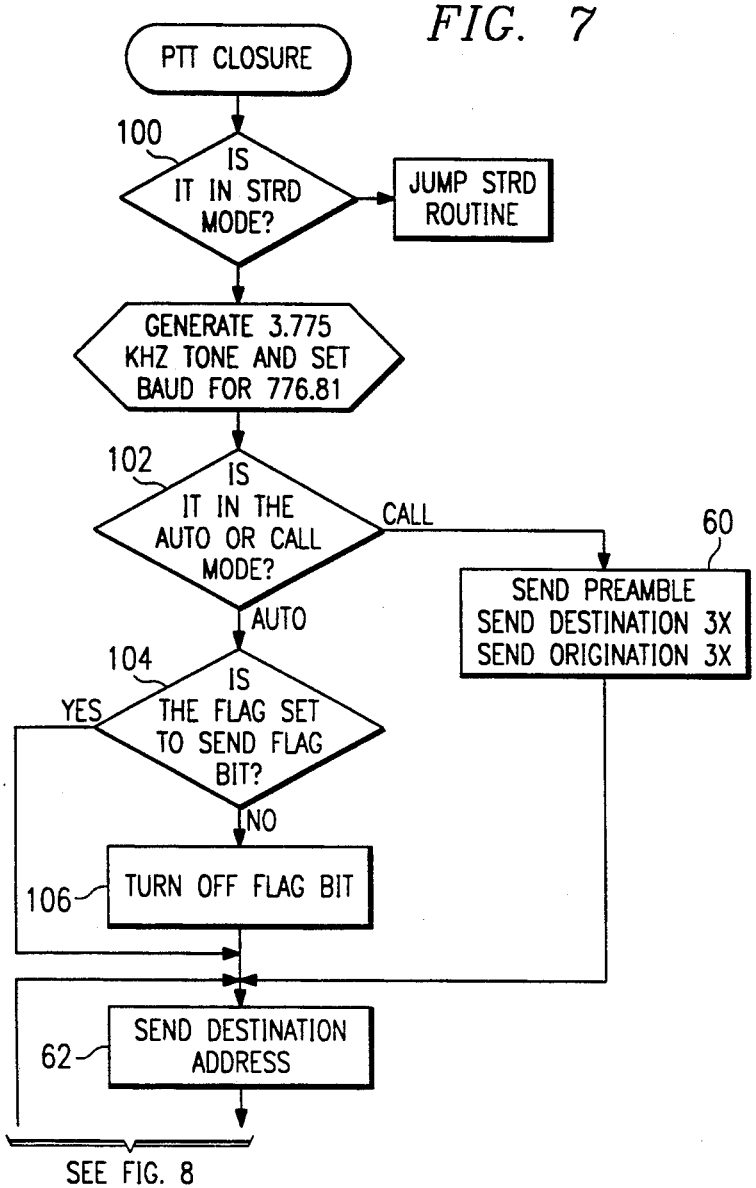
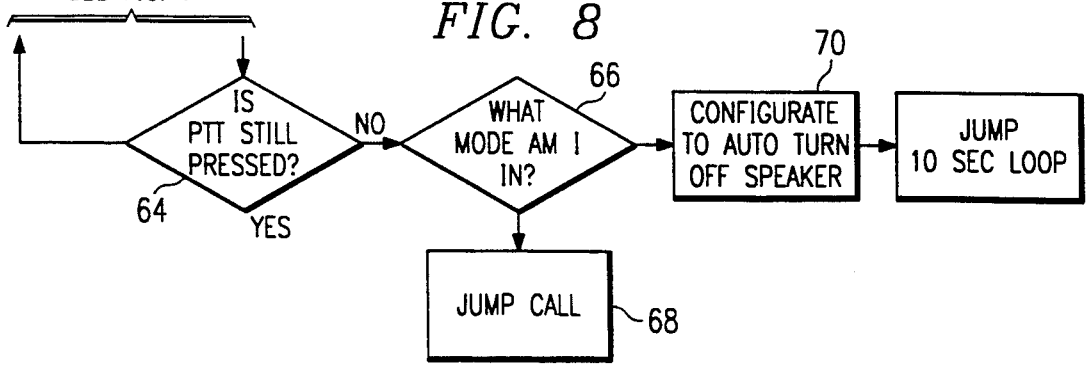

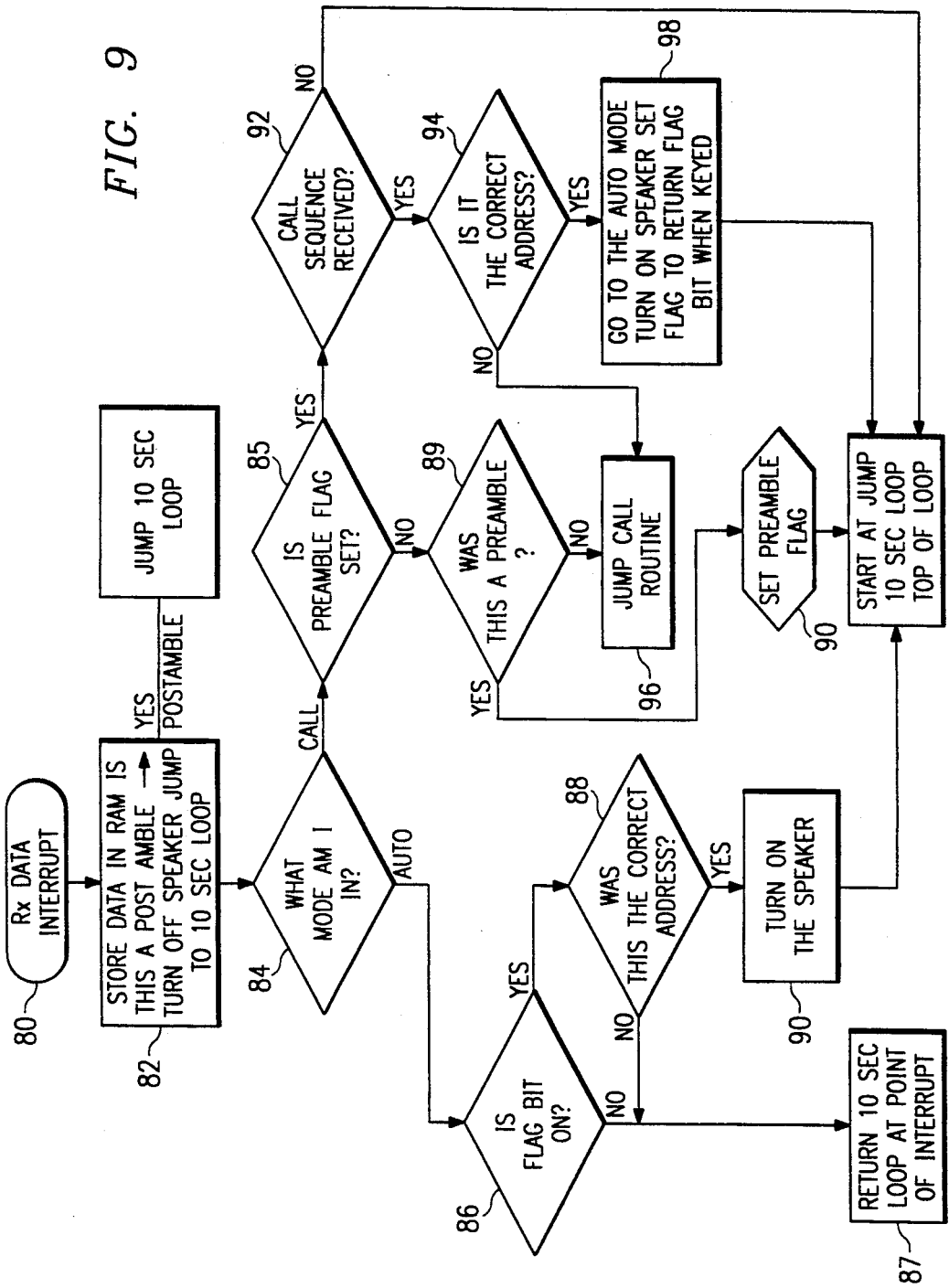

COMMUICATION DEVICE AND METHOD USING TRANSCEIVER SQUELCH CONTROL

The present application is a continuation of application Ser. No. 07/386,023, filed on Jul. 26, 1989, which matured into U.S. Pat. No. 5,058,205 on Oct. 15, 1991, said application being a continuation-in-part of application Ser. No. 07/152,769, filed on Feb. 5, 1988, now abandoned.

FIELD OF THE INVENTION

This invention relates to a squelch control for two-way radio communication systems, and more particularly, to squelch control having a coding arrangement for improving privacy of communications between radio transceivers.

BACKGROUND OF THE INVENTION

In multiple-user radio transceiver communications, coded squelch circuits are commonly used to limit communication to selected radio transceiver stations within a large group of stations operating on a common frequency. For example, a digitally-coded address may be sent by a calling station to turn off the squelch at only a selected one of the other stations to receive a message. A separate tone, combination of tones, or digitally coded signals are transmitted continuously to keep the squelch circuit turned off at the selected station. One such system is described, for example, in U.S. Pat. No. 4,646,358. The system described in this patent requires that all signalling between transceivers include both the address code of the originating station and the address code of the destination station be sent with each two-way transmission. The origination address code is stored at the receiving station and used as the destination address code on the return transmission. Such known systems have several disadvantages. For example, having to send two digitally-coded addresses with each transmission increases the chance for coding and transmission errors. For instance, if an origination address is incorrectly received, stored, or retransmitted as a destination address, the squelch circuit at some unwanted station may be accidentally turned off. Moreover, if communication with the originating station is interrupted, communication with the originating station is difficult to reestablish.

SUMMARY OF THE INVENTION

The present invention is directed to an improved two-way radio communication system in which the address of the call originating station is only transmitted with the initial message from the originating station to identify the source of the message. A responding station does not send its own address nor does the originating station send its own address again during two-way communication between the two stations. Once a communication link is established between two stations, no other station can establish communication with either station or have its own squelch circuit accidentally turned off by an error in address coding. Any error in the transmission of an address cannot result in inadvertent communication with another station in response to the erroneous address. The present invention also allows communication links to be set up simultaneously among a group of stations using a group address common to all stations within a selected group while providing the same protection of stations not in the group.

These and other advantages are achieved by providing a two-way communication system in which each of a plurality of transceiver stations is initially put in a Call mode of operation. Any station operating in the Call mode, when initiating a call, transmits a destination address of another station and a flag bit that is set or "on, " indicating it is transmitting in the Call mode. When initiating a call, the initiating station also sends its own address to identify the source of the call. When another station also in the Call mode receives its own address together with a flag bit that is set, it stores the address of the originating station, turns off its squelch circuit, and switches to an Auto mode of operation. On initiating a return message in the Auto mode, the destination station first transmits the stored origination address as a destination address together with a flag bit that is set or "on." The call originating station, upon receiving its own address back together with the set flag bit, goes into the Auto mode and turns off its squelch circuit. Both stations now are in the Auto mode. In the Auto mode, the two stations maintain two-way communication exclusively with each other by transmitting only the stored address of the other station together with a flag bit that is "off," i.e., no longer set. Since all other stations are in the Call mode, their squelch control circuits will not respond to communications between these two stations. Thus, no other station can have its squelch circuit inadvertently turned off by coding errors in the transmitted address information and no other station may interrupt this exclusive two-way communication between these two stations.

BRIEF DESCRIPTION OF THE DRAWINGS

For a better understanding of the invention, reference should be made to the accompanying drawings, wherein:

FIGS. 4-9 are flow diagrams of the software used in the operation of the squelch control circuit.

DETAILED DESCRIPTION

Figure 1:
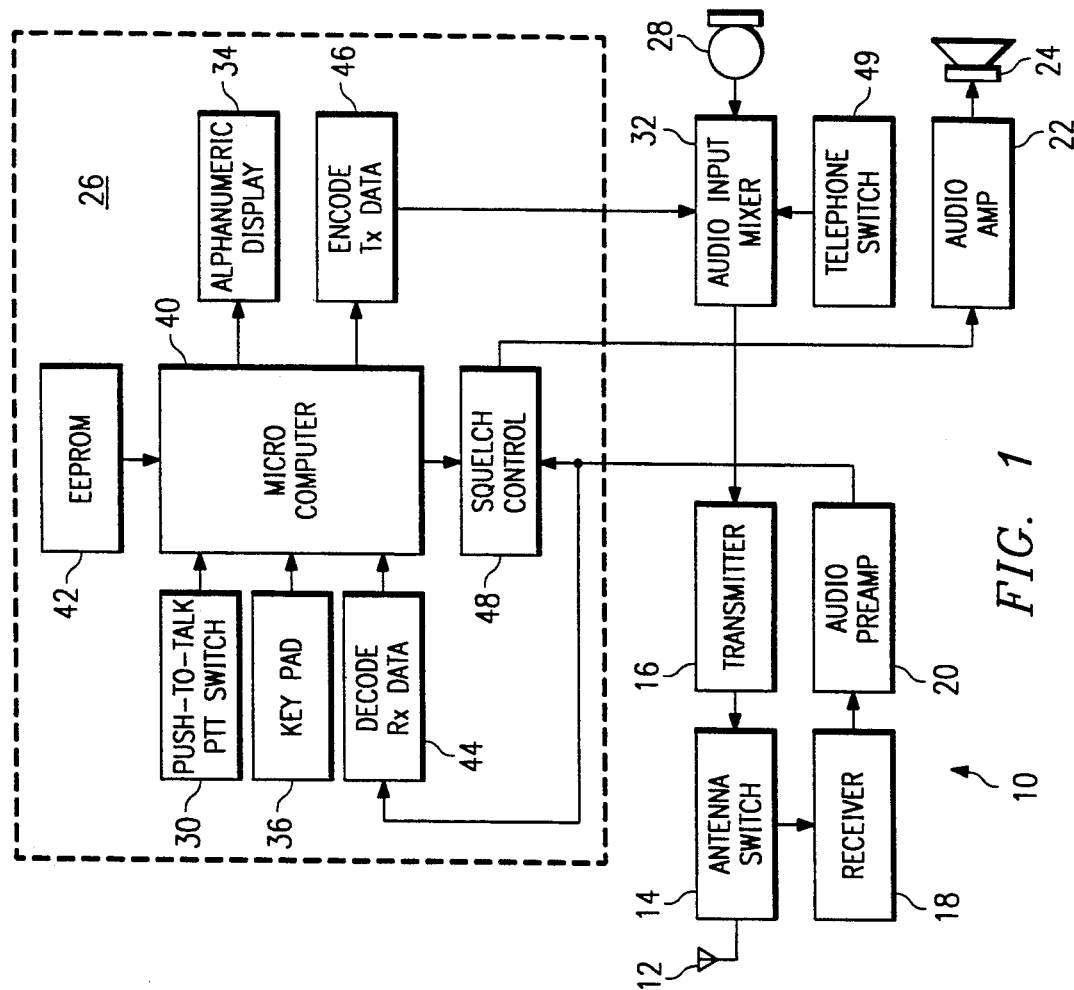
FIG. 1 is a schematic block diagram of a transceiver station utilizing the present invention.

Referring to FIG. 1 in detail, the numeral 10 indicates generally a transceiver station. In a two-way communication system, two or more such transceivers are linked by radio signals at a common carrier frequency to provide voice communication between stations. Each station includes an antenna 12 selectively connected by an antenna switch 14 to the output of a transmitter 16 or to the input of a receiver 18. Transmitter 16 and receiver 18 comprise, in the preferred embodiment of this invention, an amplitude modulated single sideband radio transceiver. An amplitude modulated single sideband radio transceiver has been found to provide substantially the greatest range and clarity of communication without requiring licensing or registration with governmental agencies by users therewith. After detection, the audio output from the receiver 18 is coupled from a preamp 20 to an audio amplifier 22 and speaker 24 through a squelch control circuit, indicated generally at 26. A microphone 28 having an associated Push-To-Talk (PTT) switch 30 is connected to the typical audio input of the modulation circuit (not shown) in the transmitter through an audio input mixer 32. Digitally-coded control signals from the squelch control circuit 26 are also electronically coupled to the transmitter audio input through the mixer 32. These control signals, as hereinafter described in detail, when received by other transceiver stations, are used to establish an exclusive two-way or half duplex private communication link and to control the audio squelch circuits at the receiving radio transceiver stations.

Figure 2:
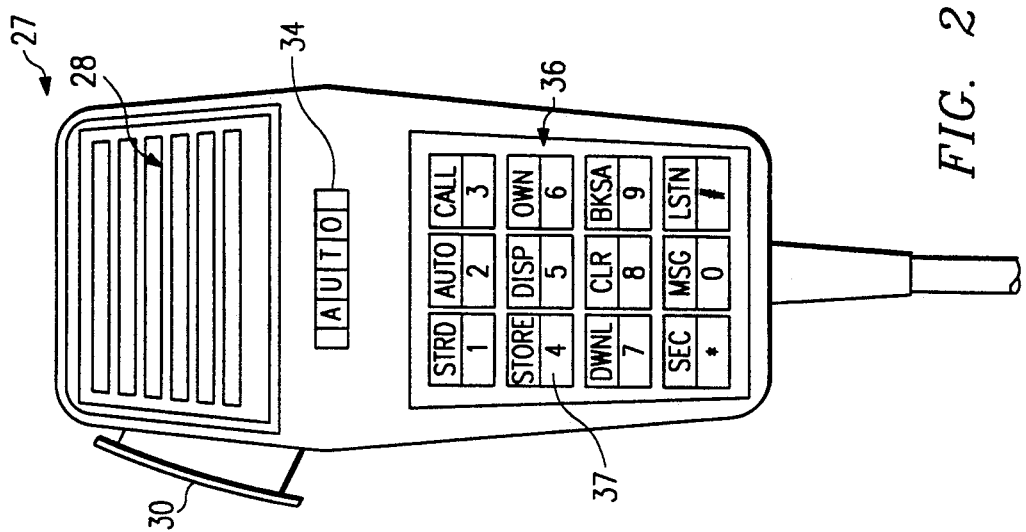
FIG. 2 shows the face of hand-held microphone and control for the transceiver.

The squelch control circuit 26 is preferably packaged in a hand-held control unit 27, such as shown in FIG. 2 or alternatively in a cellular phone style handset. In addition to the control circuit 26, the hand-held unit 27 includes the microphone 28 and the PTT switch 30. It also includes a 12-key dual tone multi-frequency pad 36 and an alphanumeric display 34, which preferably displays eight alphanumeric characters at a time. The key pad has two modes of operation: a dial mode in which the keys 37 are used as a telephone dial to enter decimal digits corresponding to call numbers or addresses of other stations, and a special mode in which the keys initiate designated control functions. The "*" key is used to switch between these two modes. Some of the key functions will be described in more detail. By using keys 1 and 3, for example, the operator can select one of two system modes of operation: a "Standard" mode or a "Call" mode of operation. In the Standard mode, no squelch control signals are transmitted. This inode is directed toward public use, such as in CB (citizen's band) communication. In the Call mode, coded control signals are used to turn off the audio squelch at one or more selected stations. It is this latter mode of operation to which the present invention is particularly directed. Keys 37 may also be used, when PTT switch 30 is depressed to send signals through a public telephone system. Such a local telephone system 49 may be electronically coupled to squelch control 48 and transmitter 16 in the manner shown in FIG. 1. Thus, pad 36 allows a user of the preferred embodiment of this invention to directly dial into a local public or private telephone system and interactively communicate with users therein.

Figure 3:
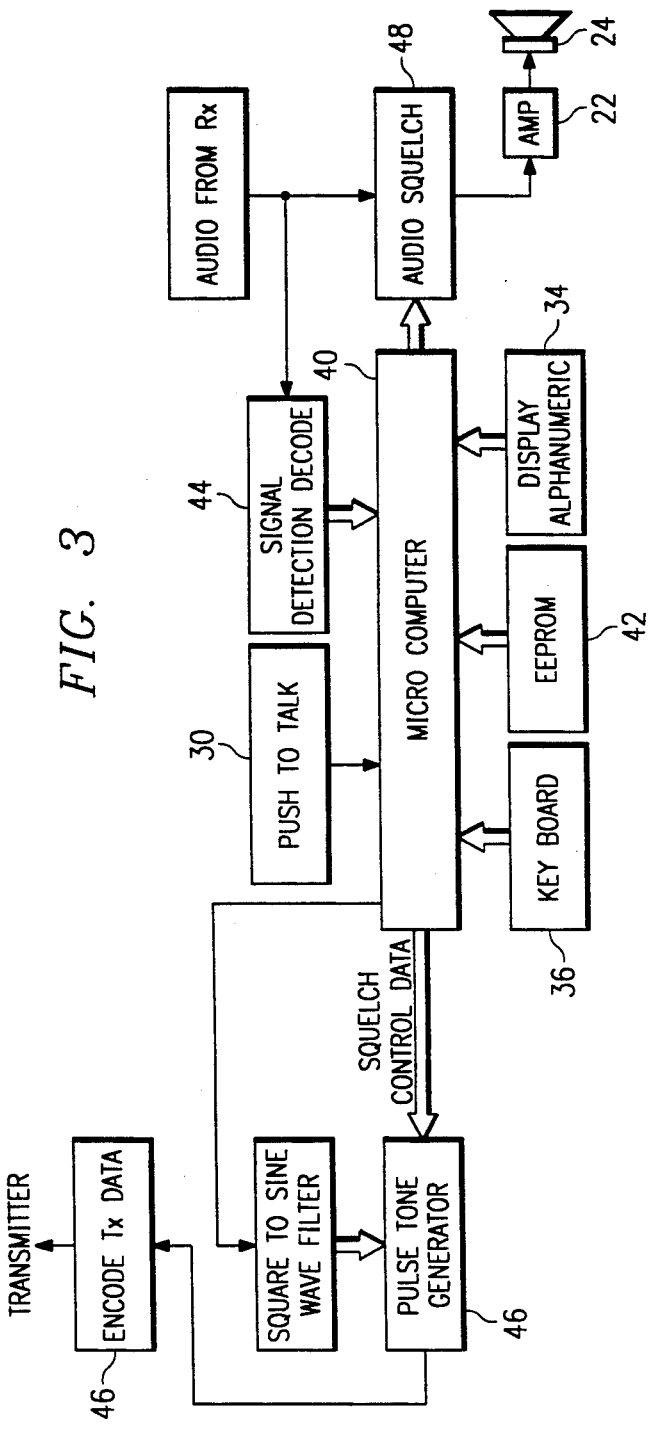
FIG. 3 is a detailed block diagram of the squelch control circuit of the present invention.

Referring to FIG. 3, the squelch control circuit 26 includes a microcomputer 40 having its own ROM for storing the control program and its own RAM for temporary storage of data being processed. Any standard computer chip, such as the 8051 sold by Intel, may be used. The microcomputer receives input information from the keyboard 36 or from an EE-PROM 42, or received control data from a signal-detection circuit 44, which decodes serial control data received from a remote station into digitally-coded words recognized by the computer. The computer 40 also outputs squelch control data to a typical frequency shift keying or alternatively to a typical phase shift type generator 46 for transmitting serially-coded control data to a remote station. The computer 40 also provides control signals to an audio squelch circuit 48 for switching the received audio signal from a remote radio transceiver station on or off to the audio amplifier 22. All of the above-described circuit components of the squelch control circuit 26 are standard, commercially-available circuit elements well known in the art.

Figure 3B:
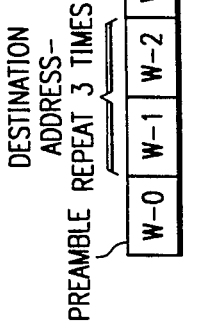
FIG. 3(b) is a diagram of the initial control message.
Figure 3A:
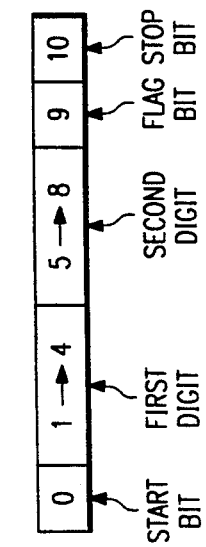
FIG. 3(a) is a diagram of the preferred message control word format.

Squelch control words are transmitted or received as 11-bit words which are formatted as shown in FIG. 3(a). Each word has a start bit followed by two hexadecimal (4-bit) characters, a flag bit, and a stop bit. To initiate a call to a remote station when operating in the Call mode, the operator first enters a four-digit address through the key pad 36. This address is a destination address and identifies the station or group of stations to be called.

When the operator depresses the PTT switch, activating the transmitter, the computer outputs a series of control words to the pulse-tone generator 46. As shown in FIG. 3(b), this series constitutes a control message and preferably includes a preamble word followed by a pair of control words that together provide the four destination-address digits. The pair of destination-address words are preferably repeated two more times to provide redundancy in the case of coding errors. The flag bit in each control word is initially set by the computer to signal that the calling station is in the Call mode. The computer then sends out three additional pairs of control words. Each pair of control words identifies the address of the calling station. This is followed by the audio message of the caller. Once the PTT switch is released following the transmission of the audio message, the computer waits a maximum of 10 seconds for a response to be received from the remote station. After 10 seconds, the computer reverts to its stand-by Call mode, waiting for another call to be initiated or an incoming call to be received. However, during the 10-second time-out, the computer of the calling station is in an Interim mode. If, during the 10-second time-out in the Interim mode, a message is received from a remote station which starts with control words that identify the address of the station initiating the call, and with the f lag bit set, the computer is switched to the Auto mode and its squelch circuit is turned off, allowing the return message to be heard. In an alternative embodiment of this invention, the control words defining the origination address are sent, as shown in FIG. 3(b), computer 40 may transmit a selected serial number and up to 16 control bits which identify a device to be controlled at the called radio transceiver station and the actual control to be performed on the selected device respectively. The aforementioned audio message of the caller is then optionally transmitted after the control bits.

Once a station is placed in the Auto mode, each subsequent transmission initiated by actuating the PTT switch within 10 seconds following the end of a received message, causes the computer to generate control words at the beginning of each transmission which identify only the address of the remote station, with the flag bit of each control word turned off. Also when receiving a message within the 10-second time-out, a computer in the Auto mode responds to a message starting with its own address and with the flag bit turned off by turning off its squelch circuit, allowing the received audio message to be switched to the speaker.

Any station in the Call mode, when it receives a transmission in which the control data is preceded by a preamble, automatically stores the subsequent group of six control words comprising the destination address and the origination address in the computer RAM. If the flag bit of each word is set and the destination address matches the address of the station receiving the message, also stored in the RAM, the computer places the receiving station in the Auto mode and turns off the squelch circuit. If the PTT switch of the receiving station is actuated within a 10-second time-out, following the end of the received message, the computer causes control words to be transmitted at the start of the return message. As noted above, these control words, when received by the call-initiating station, turn off the squelch circuit and put the call-initiating station in the Auto mode. These control words returned by the initial response of the called station identify the stored address of the originating station and have the flag bit turned on or set.

With both communicating stations now in the Auto mode, all subsequent back-and-forth communications between the two stations are preceded by the address of the station receiving the communication but with the flag bit turned off. Thus, only the initial transmission from the initiating station requires transmission of both the destination address and the origination address to turn off the squelch circuit. All subsequent communications initiated within the 10-second time-out require the transmission of only the destination address to turn off the squelch circuit at the receiving station. In this manner, exclusive two-way communication is established between a call originating radio transceiver station and the called station and may not be interrupted by any of the other radio transceiver stations due to the fact that these other stations are transmitting control words with a flag bit turned on.

Figure 4:
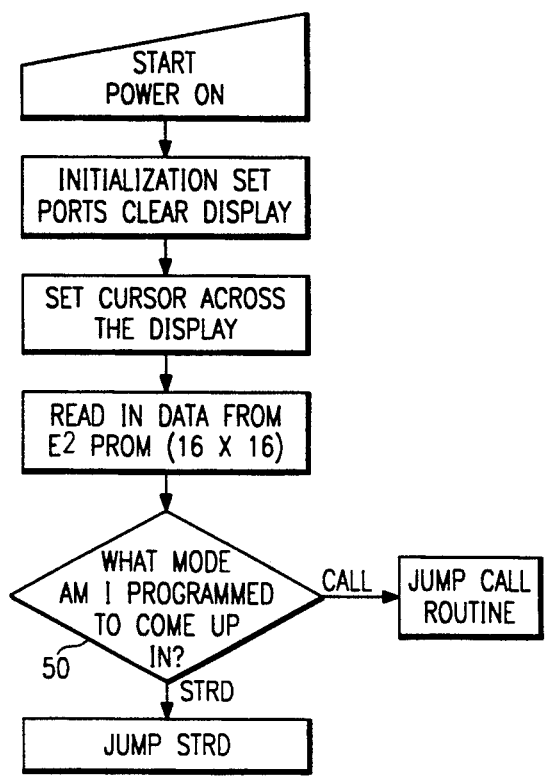

All the above-described operations at each station are controlled by the programmed microcomputer 40 located at each station. The program for operating the computer 40 at each station is summarized by the flow diagrams of FIGS. 4-9. Referring to FIG. 4, when the power is turned on, the computer goes through an initialization routine which sets the input and output ports and clears the display. The computer then reads in system configuration information from the EE-PROM 42. This allows the system to be customized to a particular user's requirements. The program then checks, as indicated at step 50, to determine if the control unit has been set to the Standard mode or the Call mode of operation by the key pad input.

Figure 5:
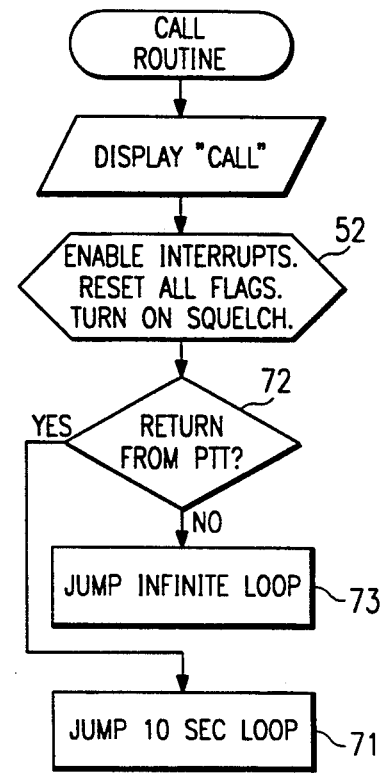
Figure 6:
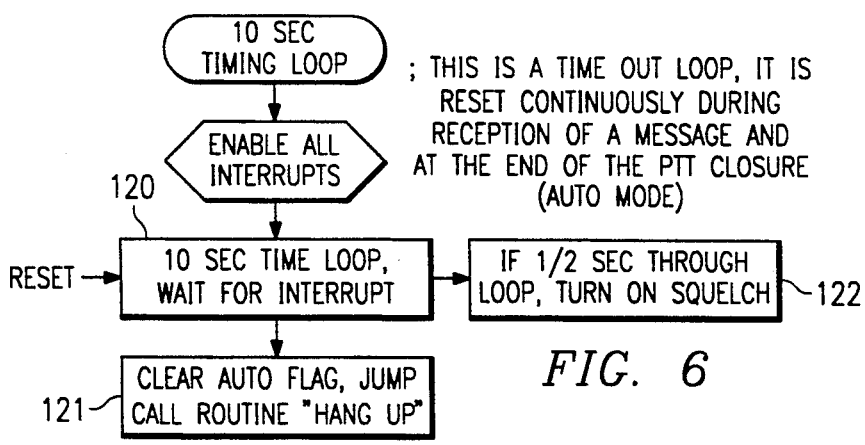
Figure 6A:
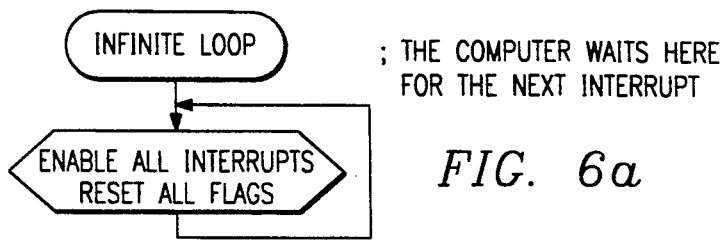

Assuming that the control unit is in the Call mode of operation, the program jumps to the Call routine, shown in FIG. 5. As indicated at step 52, in the Call routine, the computer turns on the audio squelch circuit 48, which turns off the audio signal to the speaker 24. If the PTT switch 30 has not been on, as indicated by the test performed at step 72, the computer enters via step 73 an Infinite loop routine, in which all interrupts are enabled. The infinite loop routine is shown in FIG. 6(a). The computer remains in the Infinite loop indefinitely, awaiting some Interrupt condition to occur.

One of the interrupts which will take the computer out of this stand-by mode is initiated by closure of the PTT switch 30, as when the operator starts sending a message to a remote station. The resulting PTT closure routine is shown in FIG. 7. Once there is a PTT switch closure, the program first checks to see whether it is in the Standard or in the Call mode. Assuming that the operator has placed the unit in the Call mode, the computer 40 outputs an approximate 2.9 khz tone signal to the pulse-tone generator 46, and sets the baud rate of the pulse-tone generator to approximately 100 bits per second in preparation for serially transmitting digital control words to the transmitter 16. At step 102 the program checks to determine if the computer is currently in a Call mode or an Auto mode. When a communication to a remote station is first being initiated, the computer at this point is in the Call mode. The program then causes a series of control words to be sent to the pulse-tone generator 46, as described above in connection with FIG. 3(b). This information is then transmitted by the pulse-tone generator as a sequence of pulses at the baud rate of the pulse-tone generator. The program first generates a preamble, followed by the destination address repeated three times, then by the origination address repeated three times. Each of the six data words required to send the destination address has the flag bit set or on. This is the program step indicated at step 60 in FIG. 7. This control message, when received at the addressed remote station, turns off the squelch circuit at the destination station. In order to keep the squelch circuit turned off at the destination station, the destination address is repeatedly sent out by the computer to the destination station while the transmission of the voice signal is taking place, as indicated at step 62 of FIG. 7. The computer tests to see if the PTT switch is still turned on, as indicated at step 64 of the flow diagram in FIG. 8. As long as the PTT switch 30 is on, the computer program loops back to step 62 and so continues to transmit the destination address, maintaining the squelch circuit turned off at the destination station.

After the call-initiating message is completed and the PTT switch 30 is released, the computer waits for a return message. The computer first checks to determine whether it is in the Call mode or the Auto mode, as indicated at step 66 in FIG. 8, and then branches to either a Call routine 68 or an Auto routine 70. Assuming that a message has just been sent by the computer operating in the Call mode, the program jumps to the Call routine shown in the flow diagram of FIG. 5. The computer tests to see whether the program is returning from an initial PTT closure, as indicated at step 72. If so, the program enters the 10-second loop 74. The flow diagram of this 10-second timing loop is shown in FIG. 6. This is a time-out loop that is reset continuously during reception of a message. If a return acknowledgement is received during the 10-second loop when the computer is in the Call mode, the program will respond to the interrupt by placing the computer in the Auto mode. The operation of this interrupt routine is shown in FIG. 9.

When the first message is returned by the destination station after receiving an initiating call, the control data received at the start of the return message includes the address of the originating station with the flag bit set or on. This data is stored in the computer RAM as indicated as step 80, and the program checks to determine what mode the computer is in, as indicated at step 84. Assuming that the originating station has sent out its initial message and is waiting for the initial response, the originating station is in an intermediate mode of operation in which it responds only to data in which the flag bit is set but does not require the address of the transmitting station to be received. In this intermediate mode, the program checks at step 86 to see if the flag bit is on. If it is not, the squelch circuit is not turned off, and as shown by step 87 the program returns to the 10-second loop illustrated in FIG. 6 at step 120, the point of the interrupt and continues the 10-second time-out. At the end of the 10-second time-out, if no proper response has been received from the destination station, as shown at step 121 of FIG. 6 the program reverts to the Call routine shown in FIG. 5 and enters the infinite loop, which puts the station in a stand-by status, waiting either for an incoming call or for a new message to be initiated by operation of the PTT switch 30.

Referring again to FIG. 9, and step 86 of the flow diagram, if the flag bit is on, the program at step 88 tests the incoming data to see if it is the correct address, that is, the address of the originating station. If the correct address has been received, the computer at the call originating station turns off its squelch circuit, which turns on its speaker, as indicated at step 90. Once the received message is terminated and the repetitive address information generated by step 62 of FIG. 7 is no longer received, the 10- second loop illustrated in FIG. 6 is allowed to time-out. At this point, after ¼ second through the 10 second timing loop, the squelch circuit is activated as indicated at step 122 in FIG. 6, turning off the speaker. At the end of the 10-second time-out, the computer is returned to the Call mode, and the program jumps to the Call routine illustrated in FIG. 5.

Summarizing the operation of the originating station, it starts a call by transmitting control data including a preamble followed by the destination address, preferably repeated three times, followed by the address of the call originating station, preferably also repeated three times. The flag bit of each of the transmitted control words is set or on. After the originating message has been sent and the PTT switch 30 is released, there is a 10-second time-out, and the station returns to its standby Call mode status. However, if, during the 10-second time-out, a return message is received which includes the address of the call originating station with the flag bit turned on, then the call originating station is placed in the Auto mode. Once in the Auto mode, any message received within the 10-second time-out that is preceded by the correct address with the flag bit turned off, operates to turn off the squelch circuit, enabling the speaker.

Consider now the operation of the program at any remote station when an initial message is received from a call originating station.

As shown by the flow diagram of FIG. 4, with the power turned on at the destination station and after initialization, the program advances to the Call routine, as indicated at step 50. The Call routine, as shown by the flow diagram in FIG. 5, places the program in the infinite loop awaiting an interrupt, such as a PTT switch 30 interrupt, or a received data interrupt. Assuming that a message is now being received from the originating station, the destination station will enter the received data interrupt routine, as indicated at step 80 in FIG. 9. The coded preamble is recognized by the computer. The program then checks to see if the preamble flag has been set, as indicated at step 85. If not, and the received control data is recognized as a preamble at step 89, the preamble flag is set or on, as indicated at step 90, and the 10-second loop is reset. If the preamble is not recognized, the program returns to the Call routine, as indicated at step 96.

Assuming that the preamble has been received and the preamble flag has been set, the program at step 98 next checks to see if the three destination addresses and three origination addresses have been received in memory. Once three pairs of address control words have been received following the preamble, the program at step 94 checks to see if it has received its own address as the destination address of the message. If its own to address has been received, then as shown at step 98 the program switches the computer to the Auto mode and turns off the squelch circuit so as to activate the speaker. At the same time, a flag is set indicating that the flag bit must be turned on with any control data returned to the originating station. This flag is necessary since, otherwise, the flag bit would not normally be transmitted during the Auto mode of operation.

After receiving the initial message from he originating station, the operator at the destination station activates the PTT switch 30, entering the PTT closure routine of the program shown in the f low diagram of FIG. 7. After determining that the station is not in the Standard ("STRD") mode, as indicated at step 100, the program tests to see if it is in the Auto or Call mode, as indicated at step 102. Since the destination or receiving station has already been placed in the Auto mode following the received data interrupt routine, the program checks at step 104 to see whether the f lag bit was set or on at the program step 98, as described above in connection with FIG. 9. If the flag has been set, a flag bit is transmitted with a destination address back to the originating station, the destination address in this case being the address previously received and stored from the originating station. At the same time, the flag is turned off so that no flag bit will be transmitted with any subsequent communication transmitted while the computer remains in the Auto mode. On any subsequent message, while in the Auto mode, the program tests to see if the flag is set, as indicated by the program step 104 in FIG. 7. On determining that the f lag is not on, the flag bit is turned off in the address control word, as indicated at step 106 in FIG. 7. The 10-second loop is being continuously reset during the reception of a message and is reset when the PTT switch 30 is released at the end of a transmission in the Auto mode. At the end of the 10-second time out, the computer returns the squelch control circuit to the Call mode.

The above-described squelch control requires the address of both the called station and the calling station to be sent with the call-initiating message to turn off the squelch circuit at the called station. Once both stations are in the Auto mode, only a single address is required to turn off the squelch circuit, as long as the 10-second delay is not allowed to time-out before a return message is received or sent. Thus, privacy is maintained and relatively exclusive non-interruptible two-way communications are established between the call initiating and called radio transceiver station. Although anyone tuned to the right carrier can monitor these transmissions, he cannot turn off their squelch circuits with his own transmission as long as they are communicating in the Auto mode. It is also possible to operate the above-described system with more than one station having the same address, known as a group address. Only the stations within the group will have their squelch circuits turned off and be put in the Auto mode, and any one of the stations within the group can in turn put the calling station in the Auto mode. Thus, only the stations within the group have their squelch circuits turned off and can communicate with each other in exclusive communication therewith.

It has been empirically found that the transmission and reception range of a radio transceiver associated with the preferred embodiment of this invention is approximately 1.2 times greater than the normal reception and transmission range associated therewith. This increase in range is due to the ability of computer 40 using the preferred embodiment of this invention to detect signals transmitted thereto which are outside the range of intelligible communication. Further, this range of the preferred embodiment of this invention cannot be effected by such things as a maladjusted squelch or low volume setting.

While the described embodiment utilizes digitally-coded control data, it will be understood that other coding techniques can be used, such as tone coding. Also, a subaudible tone may be used, for example, during transmission of a message to keep the squelch circuit turned off rather than continuously transmitting the destination address throughout the duration of the audio message.

We claim:

1. A squelch control circuit for use with a first and a second transceiver, each of siad transceivers having a unique address said squelch control circuit comprising:
   (a) means to encode, electronically coupled to each of said transceivers, for creating and generating the unique address associated therewith; and
   (b) computer means, electronically coupled to said means to encode and to each of said radio transceivers, for causing:
      (i) a first control message containing the unique address of the first transceiver, the unique address the second transceiver, and a flag bit that is set, to be communicated to said second transceiver from said first transceiver;
      (ii) said second radio transceiver to thereafter communicate to said first transceiver a second control message containing said address of said first transceiver and having a flag bit that is set;
      (iii) said first transceiver to communicate the combination of a third control message and said transmitted audio signal output of said first transceiver to said second transceiver, wherein said third control message contains said unique address of said second transceiver and having a flag bit that is off;
      (iv) said second transceiver to communicate the combination of a fourth control message and said transmitted audio signal output of said second transceiver to said first transceiver, wherein said fourth control message contains said unique address of said first transceiver; and
      (v) said squelch circuits of each of said first and second transceivers to turn off their respective squelch circuits in response to said third and fourth control message respectively, thereby causing said first and second transceivers to exclusively communicate each of said transmitted audio signal outputs of said first and second transceivers therebetween.

2. The squelch control circuit of claim 1 further comprising:
   (c) selecting means, electronically coupled to each of said transceivers, for selecting said first and second transceivers from said transceiver.

3. The squelch control circuit of claim 2 wherein said selecting means comprises:
   a dual tone multi-frequency keypad.

4. The squelch control circuit of claim 1 further comprising:
   (c) display means, electronically coupled to said computer means for displaying said unique address of said transceivers.

5. The squelch control circuit of claim 1 further comprising:
   (c) means for coupling one said transceivers to a telephone switch.

6. The squelch control circuit of claim 1 wherein said exclusive communication between said two transceivers comprises:
   half-duplex communication.

7. The squelch control circuit of claim 1 wherein said exclusive communication between said two transceivers comprises:
   full-duplex communication.

8. The squelch control circuit of claim 1 further comprising:
   communication termination means, electronically coupled to said computer means, for terminating said exclusive communication between said first and second transceivers.

9. The squelch control circuit of claim 1 wherein said means to encode comprises:
   a modulation generator.

10. A method for establishing exclusive two-way communication between a call originating radio transceiver and one of a plurality of remote radio transceivers, said call originating and said plurality of remote radio transceivers each having an associated received signal output, an associated audio amplifier, and a squelch circuit coupled between said associated received signal output and said associated audio amplifier, said squelch circuit capable of connecting said associated received signal output and said associated audio amplifier, wherein each of said plurality of remote radio transceivers and said call originating radio transceiver having a unique address associated therewith and an associated transmitted signal output normally communicated to a different radio transceiver therefrom in combination with a control word defining said unique address associated with said different radio transceiver and a control word defining said unique address of said communicating radio transceiver wherein each of said control words contains a first flag bit, said method comprising:
   (a) selecting one of said remote radio transceivers;
   (b) causing said call originating radio transceiver to communicate said associated transmitted signal output in combination with a control word defining said unique address of said call originating radio transceiver and a control word defining said unique address of said selected remote radio transceiver to said selected remote radio transceiver, said control words each containing said first flag bit therein;
   (c) causing said call originating radio transceiver to wait for a first predetermined period of time;
   (d) causing said selected remote radio transceiver to communicate said associated transmitted signal output in combination with a control word defining said unique address of call originating radio transceiver and containing a first flag bit therein to said call originating radio transceiver within said first predetermined period of time;
   (e) causing said selected remote radio transceiver to wait for a second predetermined period of time;
   (f) causing said call originating radio transceiver to communicate said associated transmitted signal output in combination with a control word defining said unique address of said selected remote radio transceiver and having a second flag bit being different than said first flag bit, to said selected remote radio transceiver within said second predetermined period of time;
   (g) causing said squelch circuit of said selected remote radio transceiver to connect said received signal output associated therewith to said audio amplifier associated therewith only upon receipt of said communicated transmitted signal output of said call origination radio transceiver having a control word communicated in combination therewith, said control word defining said unique address of said selected remote radio transceiver and having a second flag bit therein;

(h) causing said call originating radio transceiver to wait for a third predetermined period of time;

(i) causing said selected remote radio transceiver to communicate said associated transmitted signal output in combination with a control word defining said unique address of said call originating radio transceiver and having said second bit therein, to said call originating radio transceiver within said third predetermined period of time; and (j) causing said squelch circuit of said call originating radio transceiver to connect said received signal output associated therewith to said audio amplifier associated therewith only upon receipt of said communicated transmitted signal output of said selected remote radio transceiver having a control word communicated in combination therewith, said control word defining said unique address of said call originating radio transceiver and having a second bit therein.

11. The method of claim 10 wherein said first, second, and third predetermined times comprise:
ten seconds.

12. A method for establishing and maintaining exclusive two-way communication between a first transceiver and a second transceiver on a first channel, each of said first and second transceivers having a unique address, a squelch control circuit, a call mode, and an auto mode, said method comprising:

biasing the first and second transceiver in the call mode wherein the squelch control circuit in each transceiver is in an "on" position;

transmitting a first data set from the first transceiver, said first data set turning the squelch control of the second transceiver to an "off" position, wherein said step of transmitting a first data set further comprises:
(i) transmitting the address of the second transceiver;
(ii) transmitting a flag bit "on" which turns the squelch control circuit of the second transceiver to an "off" position;
(iii) transmitting the address of the first transceiver;
(iv) repeatedly transmitting the address of the first transceiver;

(c) transmitting a second data set from the second transceiver, said second data set turning the squelch control circuit of the first transceiver to an "off" position, wherein the step of transmitting a second data set comprises:
(i) transmitting the address of the first transceiver;
(ii) transmitting a flag bit "on" which turns the squelch control circuit of the first transceiver to an "off" position;
(iii) transmitting the address of the second transceiver; and
(iv) repeatedly transmitting the address of the first transceiver; and (d) transmitting a third data set from the first or second transceiver, said third data set turning the squelch control circuit of the other transceiver in the off position, wherein the step of transmitting a third data set comprises:

(i) transmitting the address of the other transceiver; and
(ii) transmitting a voice and/or data signal.

13. The method of claim 12 further comprising:
(e) continuously scanning a spectrum of available channels for a conflicting signal.

14. The method of claim 12 further comprising:
(e) causing said first or second transceiver to wait for a predetermined period of time before automatically switching the squelch control circuit back to the "on" position.

15. A method for establishing and maintaining exclusive two-way communication between a first transceiver and a second transceiver on a first channel, each of said first and second transceivers having a unique address, a squelch control circuit, a call mode, and an auto mode, said method comprising:

(a) biasing the first and second transceiver in the call mode wherein the squelch control circuit in each transceiver is in an "on" position;

(b) transmitting a first data set from the first transceiver, said first data set turning the squelch control of the second transceiver to an "off" position;

(c) transmitting a second data set from the second transceiver, said second data set turning the squelch control circuit of the first transceiver to an "off" position; and (d) transmitting a third data set from the first or second transceiver, said third data set maintaining the squelch control circuit of the other transceiver in the off position; and wherein said step of transmitting a first data set comprises transmitting the address of the second transceiver; transmitting a flag bit "on+ which turns the squelch control circuit of the second transceiver to an "off" position; transmitting the address of the first transceiver; and repeatedly transmitting the address of the second transceiver.

16. A method for establishing and maintaining exclusive two-way communication between a first transceiver and a second transceiver on a first channel, each of said first and second transceivers having a unique address, a squelch control circuit, a call mode, and an auto mode, said method comprising:

(a) biasing the first and second transceiver in the call mode wherein the squelch control circuit in each transceiver is in an "on" position;

(b) transmitting a first data set from the first transceiver, said first data set turning the squelch control of the second transceiver to an "off" position;

(c) transmitting a second data set from the second transceiver, said second data set turning the squelch control circuit of the first transceiver to an "off" position; and (d) transmitting a third data set from the first or second transceiver, said third data set maintaining the squelch control circuit of the other transceiver in the off position; and wherein the setp of transmitting a second data set comprises transmitting the address of the first transceiver; transmitting a flag bit "on+ which turns the squelch control circuit of the first transceiver to an "off" position; transmitting the address of the second transceiver; and repeatedly transmitting the address of the first transceiver.

17. A method for establishing and maintaining exclusive two-way communication between a first transceiver and a second transceiver on a first channel, each of said first and second transceivers having a unique address, a squelch control circuit, a call mode, and an auto mode, said method comprising:

(a) biasing the first and second transceiver in the call mode wherein the squelch control circuit in each transceiver is in an "on" position;
(b) transmitting a first data set from the first transceiver, said first data set turning the squelch control of the second transceiver to an "off" position;
(c) transmitting a second data set from the second transceiver, said second data set turning the squelch control circuit of the first transceiver to an "off" position; and
(d) transmitting a third data set from the first or second transceiver, said third data set maintaining the squelch control circuit of the other transceiver in the off position; and wherein the setp of transmitting a third data set comprises repeatedly transmitting the address of the other transceiver; and transmitting a voice and/or data signal.

* * * * *